H. C. BERG.
CLEVIS.
APPLICATION FILED AUG. 2, 1913.

1,117,310.  Patented Nov. 17, 1914.

Witnesses
Robert M. Sutphen
A. J. Hurd

Inventor
H. C. BERG.

By Watson E. Coleman
Attorney

UNITED STATES PATENT OFFICE.

HJALMAR C. BERG, OF STARBUCK, MINNESOTA.

CLEVIS.

1,117,310.  Specification of Letters Patent.   Patented Nov. 17, 1914.

Application filed August 2, 1913. Serial No. 782,737.

*To all whom it may concern:*

Be it known that I, HJALMAR C. BERG, a citizen of the United States, residing at Starbuck, in the county of Pope and State of Minnesota, have invented certain new and useful Improvements in Clevises, of which the following is a specification, reference being had to the accompanying drawings.

This invention relates to clevises, and it more particularly relates to an improved spring clevis.

An object of this invention is to provide a simple, comparatively inexpensive clevis of this character which is thoroughly practical and effective, and which may be easily manufactured by the ordinary operation of metal shearing, punching and stamping, or it may be manufactured by any blacksmith or metal worker with hand tools.

The invention is designed for attachment to a wagon or other vehicle, but it is more particularly designed for attachment to plows to be used in ground which has stumps, roots and stones; in which such a device is essential for preventing breakage of the plow and harm to the draft animals and driver.

Figure 1:
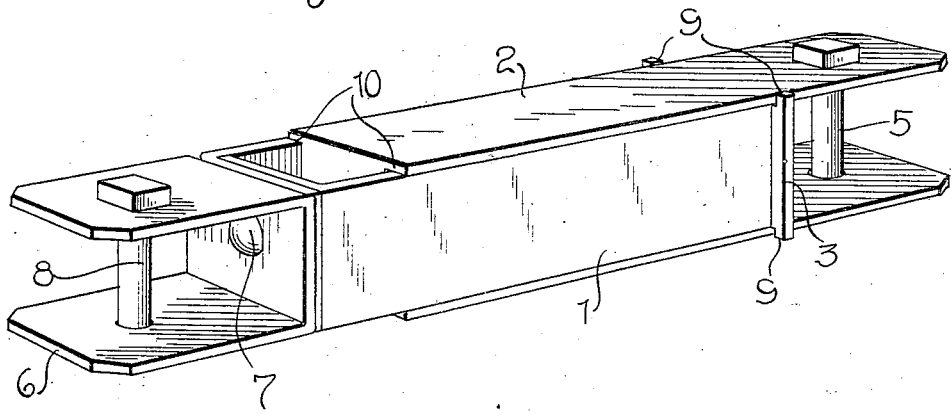
Figure 2:
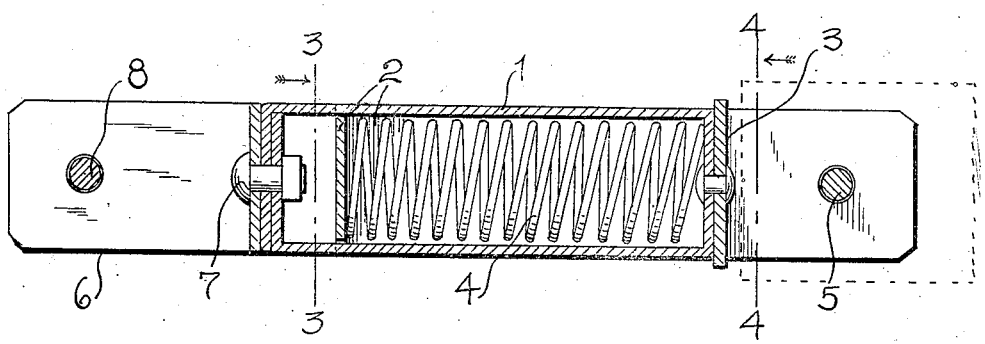
Figure 3:
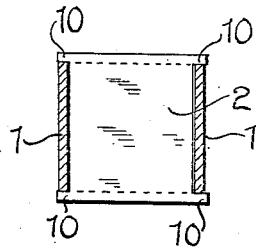
Figure 4:
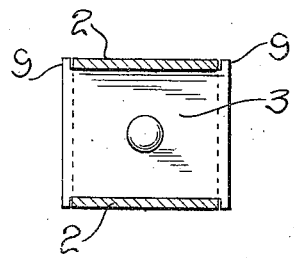

In the accompanying drawings, which supplement this specification, Figure 1 is a perspective view of the complete device which constitutes my invention; Fig. 2 is a longitudinal sectional view therethrough; Fig. 3 is a transverse sectional view on the line 3—3 of Fig. 2; and Fig. 4 is a transverse sectional view on the line 4—4 of Fig. 2.

In these drawings, in which similar reference characters correspond with similar parts throughout the several views, the principal member of the clevis comprises three sheet metal parts 1, 2 and 3 respectively; a compression spring 4 and a connecting bolt 5, the latter having an ordinary nut thereon and being seated in registering apertures through the end portions of the member 2. As herein embodied, the frame 1 is composed of two substantially L-shape sections, with the feet thereof disposed in overlying relation. A clip 6 is provided with a medial aperture through which a screw-bolt or pivot element 7 extends, said pivot element extending through the registering apertures in the lapped end portions of the member 1, for pivotally or swivelly connecting the clip to the element 1 of the expansible clevis member and also serving to maintain the sections of the frame 1 in assembled relation. The clip 6 has its end portions provided with registering apertures through which a bolt 8 extends, for connecting the clip to a swingletree, doubletree, or whiffletree.

The apertured end portions of the member 2 are adapted to fit against opposite sides of a plow-beam, wagon-tongue or the like, while the bolt 5 extends therethrough, for securely attaching the clevis to the vehicle or plow to be drawn. The plate 3 is provided with guide lugs 9 between which the parallel edges of the member 2 are slidably seated. The medial portion of the member 2 is cut away or narrowed, so as to provide guide shoulders 10 between which the rectilinear and parallel sides of the member 1 are slidably seated. It will be seen, therefore, that the members 1 and 2 are held in parallel relation with each other by means of said guide lugs and guide shoulders, and that said members combine to form a housing or spring casing in which the spring 4 is retained and held axially alined with the vertical center of the casing without the necessity for any auxiliary means for holding said spring. It is obvious that this casing is capable of carrying a spring which is sufficiently large and strong to cushion any shock which is likely to occur in the employment of a plow or vehicle, and that such a spring may be of the simplest form of helical springs, and may be replaced by a similar spring which may be easily made by an ordinary blacksmith or machinist.

While the accompanying drawings illustrate what I believe to be the preferred embodiment of my invention, it is to be understood that the invention is not limited thereto, but that various changes may be made in the construction, arrangement and proportions of the parts without departing from the scope of the invention, as defined in the appended claims.

I claim:

A clevis comprising a U-shaped member having the free extremities of the stems thereof provided with engaging means, the base being of less width than the width of the stems, said member being composed of duplicate sections substantially L-shape in form, with the feet thereof disposed in overlying relation, a frame member of substantially rectangular form having its sides positioned between the free longitudinal marginal portions of the U-shaped member, one end of such frame being projected laterally beyond opposite sides of the frame, such projected portions being provided with oppositely directed lugs adapted to contact with the adjacent edges of the stems, a cushioning member interposed between the base of the U-shaped member and the end of the frame provided with the lateral extensions, a clip, and means for pivotally connecting said clip to the base portion of the first mentioned member, said means engaging the overlying portions of the sections comprised in said first mentioned member and serving to maintain said sections in assembled relation.

In testimony whereof I hereunto affix my signature in the presence of two witnesses.

HJALMAR C. BERG.

Witnesses:
T. C. BERG,
P. T. SIMONSON.